United States Patent
Rocholl et al.

(10) Patent No.: US 11,097,617 B2
(45) Date of Patent: Aug. 24, 2021

(54) AUXILIARY POWER SYSTEM FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Chad Smith, Omro, WI (US); Mike Bolton, Oshkosh, WI (US); Shawn Naglik, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/007,236

(22) Filed: Aug. 31, 2020

(65) Prior Publication Data
US 2020/0398670 A1    Dec. 24, 2020

Related U.S. Application Data

(63) Continuation of application No. 16/851,152, filed on Apr. 17, 2020.
(Continued)

(51) Int. Cl.
*B60K 1/02*    (2006.01)
*B60L 1/00*    (2006.01)
(Continued)

(52) U.S. Cl.
CPC ............. *B60L 1/003* (2013.01); *B60K 1/02* (2013.01); *B60K 1/04* (2013.01); *B65F 3/04* (2013.01);
(Continued)

(58) Field of Classification Search
CPC ... B60L 1/003; B60K 1/02; B60K 1/04; B65F 3/04
See application file for complete search history.

(56) References Cited

U.S. PATENT DOCUMENTS

| | | |
|---|---|---|
| 3,666,126 A | 5/1972 | Rempel |
| 3,804,277 A | 4/1974 | Brown et al. |

(Continued)

OTHER PUBLICATIONS

U.S. Appl. No. 16/851,152, filed Apr. 17, 2020, Oshkosh Corporation.

*Primary Examiner* — John D Walters
*Assistant Examiner* — James J Triggs
(74) *Attorney, Agent, or Firm* — Foley & Lardner LLP

(57) ABSTRACT

A refuse vehicle including a chassis, a body assembly coupled to the chassis, the body assembly defining a refuse compartment, an electric energy system, an auxiliary power system comprising a reservoir to hold a hydraulic fluid, and a hydraulic pump powered by an electric motor, wherein the electric motor is powered by the electric energy system and the hydraulic pump pressurizes the hydraulic fluid to power one or more actuators, and wherein a prime mover of the refuse vehicle charges the electric energy system.

20 Claims, 7 Drawing Sheets

Related U.S. Application Data

(60) Provisional application No. 62/843,062, filed on May 3, 2019, provisional application No. 62/881,089, filed on Jul. 31, 2019.

(51) Int. Cl.
  *B60K 1/04*     (2019.01)
  *B65F 3/04*     (2006.01)
  *B60L 50/00*    (2019.01)
  *B65F 3/02*     (2006.01)
  *B60K 1/00*     (2006.01)
  *B60K 6/22*     (2007.10)

(52) U.S. Cl.
  CPC .......... *B60K 6/22* (2013.01); *B60K 2001/006* (2013.01); *B60K 2001/0405* (2013.01); *B60L 50/00* (2019.02); *B60L 2200/36* (2013.01); *B60L 2200/40* (2013.01); *B60Y 2200/91* (2013.01); *B60Y 2200/92* (2013.01); *B65F 2003/0279* (2013.01)

(56) References Cited

U.S. PATENT DOCUMENTS

| | | |
|---|---|---|
| 4,016,988 A | 4/1977 | Dahlin |
| 4,175,903 A | 11/1979 | Carson |
| 4,200,330 A | 4/1980 | Scott |
| 4,225,182 A | 9/1980 | Werner |
| 4,252,495 A | 2/1981 | Cook |
| 4,618,306 A | 10/1986 | Dorsch |
| 4,704,062 A | 11/1987 | Hale |
| 4,771,837 A | 9/1988 | Appleton et al. |
| 5,171,121 A | 12/1992 | Smith et al. |
| 5,378,010 A | 1/1995 | Marino et al. |
| 5,639,201 A | 6/1997 | Curotto |
| 5,731,705 A | 3/1998 | Guinn |
| 5,833,428 A | 11/1998 | Szinte |
| 5,919,026 A | 7/1999 | Appleton |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,317 B1 | 5/2001 | Kann et al. |
| 6,224,318 B1 | 5/2001 | McNeilus et al. |
| 6,247,713 B1 | 6/2001 | Konop |
| 6,266,598 B1 | 7/2001 | Pillar et al. |
| 6,315,515 B1 | 11/2001 | Young et al. |
| 6,336,783 B1 | 1/2002 | Young et al. |
| 6,350,098 B1 | 2/2002 | Christenson et al. |
| 6,421,593 B1 | 7/2002 | Kempen et al. |
| 6,447,239 B2 | 9/2002 | Young et al. |
| 6,474,928 B1 | 11/2002 | Christenson |
| 6,497,547 B1 * | 12/2002 | Maglaras ............... B60P 1/006 414/498 |
| 6,516,914 B1 | 2/2003 | Andersen et al. |
| 6,553,290 B1 | 4/2003 | Pillar |
| 6,565,305 B2 | 5/2003 | Schrafel |
| 6,843,148 B2 | 1/2005 | Marcel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,654,354 B1 | 2/2010 | Otterstrom |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,398,176 B2 | 3/2013 | Haroldsen et al. |
| 8,540,475 B2 | 9/2013 | Kuriakose et al. |
| 8,550,764 B2 | 10/2013 | Rowland et al. |
| 8,807,613 B2 | 8/2014 | Howell et al. |
| 8,857,567 B1 | 10/2014 | Raymond |
| 9,045,014 B1 | 6/2015 | Verhoff et al. |
| 9,067,730 B2 | 6/2015 | Curotto |
| 9,114,804 B1 | 8/2015 | Shukla et al. |
| 9,132,736 B1 | 9/2015 | Shukla et al. |
| 9,174,686 B1 | 11/2015 | Messina et al. |
| 9,216,856 B2 | 12/2015 | Howell et al. |
| 9,290,093 B2 | 3/2016 | Turner et al. |
| 9,296,558 B2 | 3/2016 | Parker |
| 9,376,102 B1 | 6/2016 | Shukla et al. |
| 9,511,932 B2 | 12/2016 | Curotto et al. |
| 9,656,640 B1 | 5/2017 | Verhoff et al. |
| 9,707,869 B1 | 7/2017 | Messina et al. |
| 9,880,581 B2 | 1/2018 | Kuriakose et al. |
| 9,902,559 B2 | 2/2018 | Parker |
| 9,926,134 B2 | 3/2018 | Ford |
| 9,981,803 B2 | 5/2018 | Davis et al. |
| 10,035,648 B2 | 7/2018 | Haddick et al. |
| 10,144,584 B2 | 12/2018 | Parker |
| 10,196,205 B2 | 2/2019 | Betz, II et al. |
| D843,281 S | 3/2019 | Gander et al. |
| 10,351,340 B2 | 7/2019 | Haddick et al. |
| 10,414,067 B2 | 9/2019 | Datema et al. |
| 10,414,266 B1 | 9/2019 | Wiegand et al. |
| 10,456,610 B1 | 10/2019 | Betz et al. |
| 10,457,533 B2 | 10/2019 | Puszkiewicz et al. |
| D869,332 S | 12/2019 | Gander et al. |
| D871,283 S | 12/2019 | Gander et al. |
| 10,513,392 B2 | 12/2019 | Haddick et al. |
| 10,556,622 B1 | 2/2020 | Calliari et al. |
| 10,558,234 B2 | 2/2020 | Kuriakose et al. |
| 10,611,204 B1 | 4/2020 | Zhang et al. |
| 10,647,025 B2 | 5/2020 | Fox et al. |
| D888,629 S | 6/2020 | Gander et al. |
| 2002/0014754 A1 | 2/2002 | Konop |
| 2002/0065594 A1 | 5/2002 | Squires et al. |
| 2002/0103580 A1 | 8/2002 | Yakes et al. |
| 2003/0130765 A1 | 7/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0200015 A1 | 10/2003 | Pillar |
| 2003/0205422 A1 | 11/2003 | Morrow et al. |
| 2004/0004346 A1 | 1/2004 | Humphries |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0069865 A1 | 4/2004 | Rowe et al. |
| 2004/0133332 A1 | 7/2004 | Yakes et al. |
| 2005/0080520 A1 | 4/2005 | Kline et al. |
| 2005/0109549 A1 | 5/2005 | Morrow |
| 2005/0113988 A1 | 5/2005 | Nasr et al. |
| 2005/0114007 A1 | 5/2005 | Pillar et al. |
| 2005/0119806 A1 | 6/2005 | Nasr et al. |
| 2005/0209747 A1 | 9/2005 | Yakes et al. |
| 2005/0234622 A1 | 10/2005 | Pillar et al. |
| 2005/0285365 A1 | 12/2005 | Manser et al. |
| 2006/0065451 A1 | 3/2006 | Morrow et al. |
| 2006/0065453 A1 | 3/2006 | Morrow et al. |
| 2006/0066109 A1 | 3/2006 | Nasr |
| 2006/0070776 A1 | 4/2006 | Morrow et al. |
| 2006/0070788 A1 | 4/2006 | Schimke |
| 2006/0071466 A1 | 4/2006 | Rowe et al. |
| 2006/0071645 A1 | 4/2006 | Bolton |
| 2006/0106521 A1 | 5/2006 | Nasr et al. |
| 2007/0061054 A1 | 3/2007 | Rowe et al. |
| 2007/0088469 A1 | 4/2007 | Schmiedel et al. |

(56) References Cited

U.S. PATENT DOCUMENTS

| | | | |
|---|---|---|---|
| 2007/0173987 A1 | 7/2007 | Rowe et al. | |
| 2007/0185625 A1 | 8/2007 | Pillar et al. | |
| 2007/0288131 A1 | 12/2007 | Yakes et al. | |
| 2007/0291130 A1 | 12/2007 | Broggi et al. | |
| 2008/0004777 A1 | 1/2008 | Quigley | |
| 2008/0012280 A1 | 1/2008 | Humphries | |
| 2008/0059014 A1 | 3/2008 | Nasr et al. | |
| 2008/0065285 A1 | 3/2008 | Yakes et al. | |
| 2008/0071438 A1 | 3/2008 | Nasr et al. | |
| 2008/0114513 A1 | 5/2008 | Pillar et al. | |
| 2008/0150350 A1 | 6/2008 | Morrow et al. | |
| 2008/0215190 A1 | 9/2008 | Pillar et al. | |
| 2008/0221754 A1 | 9/2008 | Rowe et al. | |
| 2009/0018716 A1* | 1/2009 | Ambrosio | B60L 58/20 701/22 |
| 2009/0079839 A1 | 3/2009 | Fischer et al. | |
| 2009/0127010 A1 | 5/2009 | Morrow et al. | |
| 2009/0194347 A1 | 8/2009 | Morrow et al. | |
| 2009/0205885 A1 | 8/2009 | Strong | |
| 2010/0116569 A1 | 5/2010 | Morrow et al. | |
| 2010/0183410 A1 | 7/2010 | Curotto | |
| 2010/0281654 A1 | 11/2010 | Curotto | |
| 2010/0301668 A1 | 12/2010 | Yakes et al. | |
| 2011/0312459 A1 | 12/2011 | Morrow et al. | |
| 2012/0143430 A1 | 6/2012 | Broggi et al. | |
| 2013/0196806 A1 | 8/2013 | Morrow et al. | |
| 2014/0020415 A1* | 1/2014 | Heyl | B60K 11/02 62/119 |
| 2014/0257621 A1 | 9/2014 | Zych | |
| 2014/0291045 A1* | 10/2014 | Collett | B60K 25/06 180/53.4 |
| 2015/0093220 A1 | 4/2015 | Parker | |
| 2015/0159564 A1 | 6/2015 | Wildgrube et al. | |
| 2015/0165871 A1 | 6/2015 | Miller et al. | |
| 2015/0283894 A1 | 10/2015 | Morrow et al. | |
| 2016/0001765 A1 | 1/2016 | Shukla et al. | |
| 2016/0023548 A1 | 1/2016 | Crist et al. | |
| 2016/0059690 A1 | 3/2016 | Wildgrube | |
| 2016/0152188 A1 | 6/2016 | Handschke et al. | |
| 2016/0297417 A1 | 10/2016 | Shukla et al. | |
| 2016/0361987 A1 | 12/2016 | Morrow et al. | |
| 2017/0008507 A1 | 1/2017 | Shukla et al. | |
| 2017/0036628 A1 | 2/2017 | Nelson et al. | |
| 2017/0121108 A1 | 5/2017 | Davis et al. | |
| 2017/0158050 A1 | 6/2017 | Crist et al. | |
| 2017/0253221 A1 | 9/2017 | Verhoff et al. | |
| 2017/0341860 A1 | 11/2017 | Dodds et al. | |
| 2017/0349373 A1 | 12/2017 | Gentry et al. | |
| 2017/0349374 A1 | 12/2017 | Haddick et al. | |
| 2017/0361491 A1 | 12/2017 | Datema et al. | |
| 2017/0361492 A1 | 12/2017 | Datema et al. | |
| 2018/0072303 A1 | 3/2018 | Shukla et al. | |
| 2018/0215354 A1 | 8/2018 | Linsmeier et al. | |
| 2018/0250847 A1 | 9/2018 | Wurtz et al. | |
| 2018/0327183 A1 | 11/2018 | Peek et al. | |
| 2018/0334324 A1 | 11/2018 | Haddick et al. | |
| 2018/0345783 A1 | 12/2018 | Morrow et al. | |
| 2019/0039407 A1 | 2/2019 | Smith | |
| 2019/0047413 A1 | 2/2019 | Crist et al. | |
| 2019/0091890 A1 | 3/2019 | Rocholl et al. | |
| 2019/0118721 A1 | 4/2019 | Handschke et al. | |
| 2019/0121353 A1 | 4/2019 | Datema et al. | |
| 2019/0137324 A1 | 5/2019 | Curotto | |
| 2019/0185077 A1 | 6/2019 | Smith et al. | |
| 2019/0193934 A1 | 6/2019 | Rocholl et al. | |
| 2019/0270587 A1 | 9/2019 | Haddick et al. | |
| 2019/0291711 A1 | 9/2019 | Shukla et al. | |
| 2019/0292975 A1 | 9/2019 | Hou et al. | |
| 2019/0322321 A1 | 10/2019 | Schwartz et al. | |
| 2019/0325220 A1 | 10/2019 | Wildgrube et al. | |
| 2019/0344475 A1 | 11/2019 | Datema et al. | |
| 2019/0351758 A1 | 11/2019 | Wiegand et al. | |
| 2019/0351883 A1 | 11/2019 | Verhoff et al. | |
| 2019/0359184 A1 | 11/2019 | Linsmeier et al. | |
| 2019/0360600 A1 | 11/2019 | Jax et al. | |
| 2019/0381990 A1 | 12/2019 | Shukla et al. | |
| 2020/0031641 A1 | 1/2020 | Puszkiewicz et al. | |
| 2020/0038700 A1 | 2/2020 | Betz et al. | |
| 2020/0039341 A1 | 2/2020 | Morrow et al. | |
| 2020/0078986 A1 | 3/2020 | Clifton et al. | |
| 2020/0087063 A1 | 3/2020 | Haddick et al. | |
| 2020/0102145 A1 | 4/2020 | Nelson et al. | |
| 2020/0130746 A1 | 4/2020 | Calliari et al. | |
| 2020/0230841 A1 | 7/2020 | Datema et al. | |
| 2020/0230842 A1 | 7/2020 | Datema et al. | |
| 2020/0231035 A1 | 7/2020 | Crist et al. | |
| 2020/0262366 A1 | 8/2020 | Wildgrube et al. | |
| 2020/0265656 A1 | 8/2020 | Koga et al. | |

\* cited by examiner

AUXILIARY POWER SYSTEM FOR ELECTRIC REFUSE VEHICLE

CROSS-REFERENCE TO RELATED PATENT APPLICATIONS

The present application is a continuation of U.S. patent application Ser. No. 16/851,152, filed Apr. 17, 2020, which claims the benefit of and priority to U.S. Provisional Patent Application No. 62/843,062, filed May 3, 2019, and U.S. Provisional Patent Application No. 62/881,089, filed Jul. 31, 2019, the contents of which are hereby incorporated by reference in their entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle including a chassis, a body assembly coupled to the chassis, the body assembly defining a refuse compartment, an electric energy system, an auxiliary power system comprising a reservoir to hold a hydraulic fluid, and a hydraulic pump powered by an electric motor, wherein the electric motor is powered by the electric energy system and the hydraulic pump pressurizes the hydraulic fluid to power one or more actuators, and wherein a prime mover of the refuse vehicle charges the electric energy system.

In some embodiments, the auxiliary power system includes a power take-off. In some embodiments, the auxiliary power system is positioned between a cab of the refuse vehicle and the body of the refuse vehicle. In some embodiments, the auxiliary power system is positioned below the body of the refuse vehicle. In some embodiments, the auxiliary power system is mounted on a surface of the body of the refuse vehicle. In some embodiments, the auxiliary power system includes a cooling system configured to thermally regulate the electric motor. In some embodiments, the auxiliary power system includes one or more electrical energy storage devices configured to power the electric motor.

Another embodiment relates to an auxiliary power system for a refuse vehicle including a reservoir to hold a hydraulic fluid, a hydraulic pump configured to pressurize the hydraulic fluid and provide the hydraulic fluid to one or more actuators, an electric motor configured to power the hydraulic pump, and a mounting assembly configured to couple the auxiliary power system to the refuse vehicle.

In some embodiments, the mounting assembly is configured to couple the auxiliary power system between a cab of the refuse vehicle and a body of the refuse vehicle. In some embodiments, the mounting assembly is configured to couple the auxiliary power system below a body of the refuse vehicle. In some embodiments, the mounting assembly is configured to couple the auxiliary power system to a surface of the body of the refuse vehicle. In some embodiments, the auxiliary power system further includes a power take-off. In some embodiments, the auxiliary power system further includes a cooling system configured to thermally regulate the electric motor. In some embodiments, the auxiliary power system further includes one or more electrical energy storage devices configured to power the electric motor.

Another embodiment relates to an electric refuse vehicle including a chassis, a body assembly coupled to the chassis, the body assembly defining a refuse compartment, a prime mover, wherein the prime mover is a first electric motor, and an auxiliary power system comprising a reservoir to hold a hydraulic fluid, and a hydraulic pump powered by a second electric motor, wherein the hydraulic pump pressurizes the hydraulic fluid to power one or more actuators.

In some embodiments, the electric refuse vehicle includes one or more electrical energy storage devices configured to provide power to at least one of the first electric motor or the second electric motor, and wherein at least one of the one or more electrical energy storage devices are detachably coupled to the electric refuse vehicle. In some embodiments, the auxiliary power system is positioned between a cab of the electric refuse vehicle and the body of the electric refuse vehicle. In some embodiments, the auxiliary power system includes a power take-off. In some embodiments, the auxiliary power system is positioned on a surface of the body of the electric refuse vehicle. In some embodiments, the auxiliary power system is positioned below the body of the electric refuse vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an auxiliary power system for a refuse vehicle is disclosed herein. The auxiliary power system of the present disclosure provides many advantages over conventional systems. The auxiliary power system may supply power for one or more components of the refuse vehicle. For example, the auxiliary power system may provide electric power to the body of the refuse vehicle, enabling the refuse vehicle to utilize electric actuators, reducing a need for hydraulic actuators, which are prone to leaking hydraulic fluid. Additionally or alternatively, the auxiliary power system may provide hydraulic power to an electric refuse vehicle. For example, an auxiliary power system supplying pressurized hydraulic fluid (via an electric hydraulic pump) may power one or more hydraulic components of the refuse vehicle. The auxiliary power system may be removable to supply power to a location disparate of the refuse vehicle. For example, the auxiliary power system may be integrated with a carry-can coupled to the refuse vehicle such that the auxiliary power system supplies power to the refuse vehicle while the carry-can is attached to the refuse vehicle and supplies power to the carry-can while the carry-can is detached from the refuse vehicle.

Overall Vehicle

Figure 1:
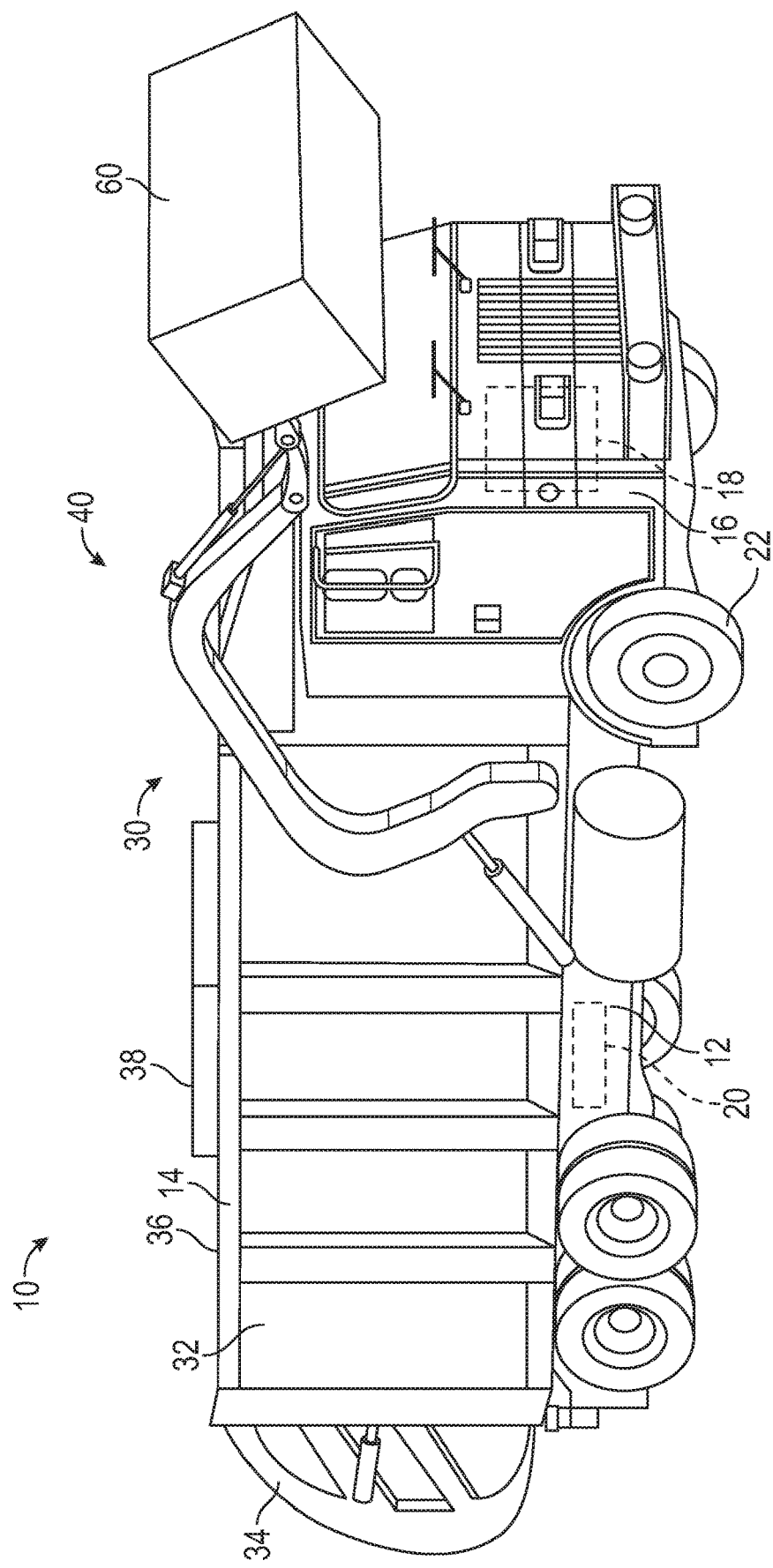
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Auxiliary Power System

Figure 2:
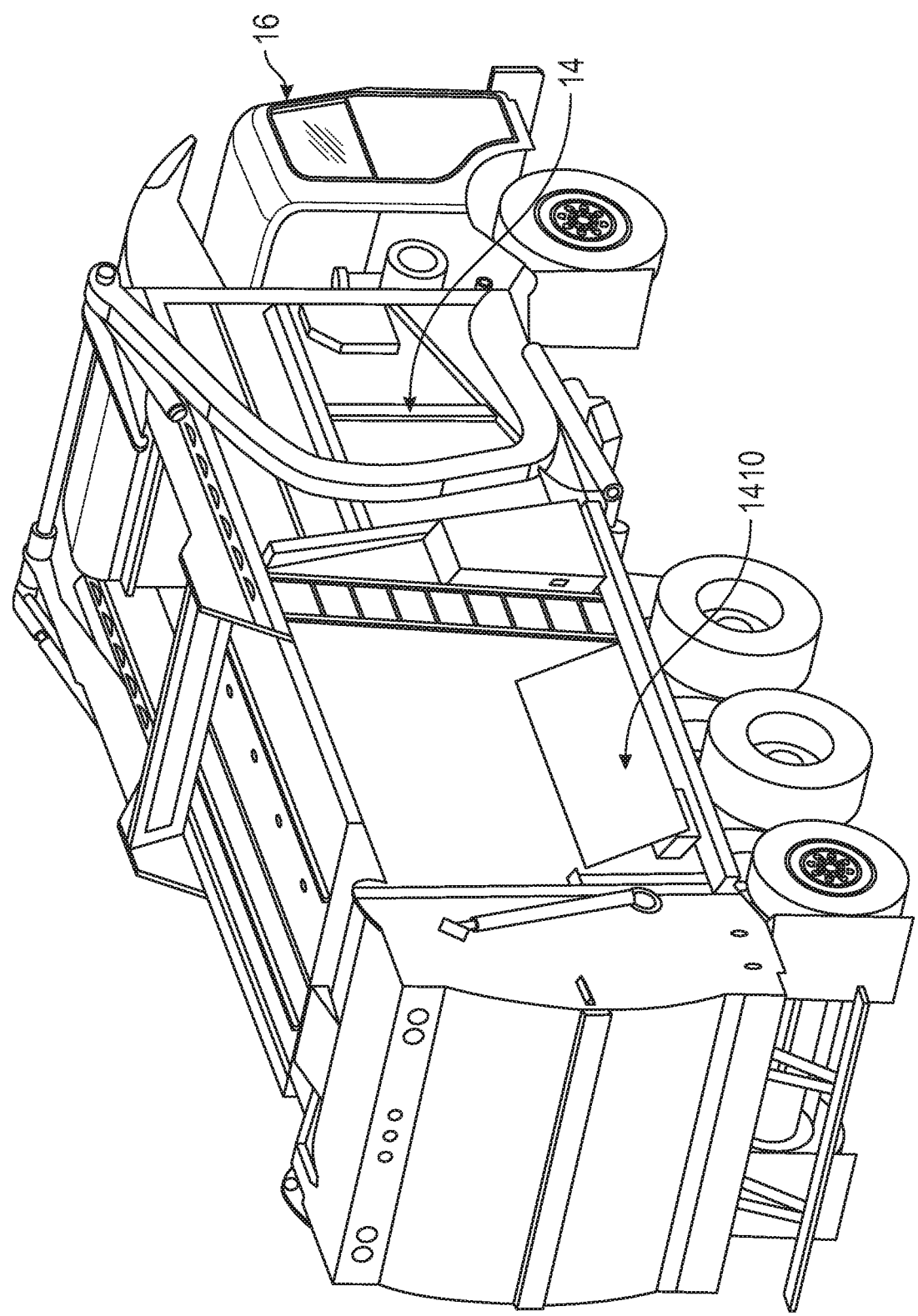
FIG. 2 is the refuse vehicle of FIG. 1 having an auxiliary power system, according to an exemplary embodiment.

As shown in FIG. 2, the refuse vehicle 10 includes an auxiliary power system 1410 coupled to the body 14 of the refuse vehicle 10. The auxiliary power system 1410 provides power to one or more components of the refuse vehicle 10. In some embodiments, the power is hydraulic power. Additionally or alternatively, the auxiliary power system 1410 may provide electric power. In some embodiments, the auxiliary power system 1410 is coupled to the energy storage and/or generation system 20 and receives electrical power therefrom. In some embodiments, the auxiliary power system 1410 includes batteries or other energy storage elements itself. In some embodiments, the auxiliary power system 1410 is coupled to a lower rearward panel of panels 32. In some embodiments, the auxiliary power system 1410 is coupled to or integrated with the tailgate 34. In some embodiments, the auxiliary power system 1410 is mounted on the lift assembly 40. Additionally or alternatively, the auxiliary power system 1410 may be detachably coupled to the refuse vehicle 10. For example, the auxiliary power system 1410 may be integrated with or power a carry-can coupled to the refuse vehicle 10. Additionally or alternatively, the auxiliary power system 1410 may be a portable residential auxiliary power unit (APU). It should be understood that the auxiliary power system 1410 can be mounted anywhere on the refuse vehicle 10.

In some embodiments, the auxiliary power system 1410 is coupled to a refuse vehicle having a diesel internal combustion engine prime mover. An internal combustion engine prime mover may charge one or more batteries of the auxiliary power unit 1410 or the energy storage and/or generation system 20. For example, the internal combustion engine may include a power take-off to power an alternator to charge the one or more batteries. In some embodiments, the auxiliary power system 1410 may power one or more components of the body 14 of an internal combustion engine refuse vehicle. For example, the auxiliary power system 1410 may power one or more electric actuators to open/close the tailgate 34. Additionally or alternatively, the auxiliary power system 1410 may augment or supplement the existing power system of a refuse vehicle. For example, the auxiliary power system 1410 may power one or more indicator lights of the refuse vehicle 10. In some embodiments, the auxiliary power system 1410 includes one or more electrical energy storage devices (e.g., batteries, etc.).

In some embodiments, the auxiliary power system 1410 integrates or otherwise combines an electrical and a hydraulic system. For example, the auxiliary power system 1410 may provide electrical power to a motor to power the cover 36 and provide hydraulic power to an actuator of the tailgate 34. Additionally or alternatively, the auxiliary power system 1410 may convert power from one system to another system. For example, the auxiliary power system 1410 may convert hydraulic power to stored potential energy for an electrical motor. As a further example, the auxiliary power system 1410 may convert stored electrical power into hydraulic power for a hydraulic system. In some embodiments, the auxiliary power system 1410 is or includes a power take-off.

Figure 3:
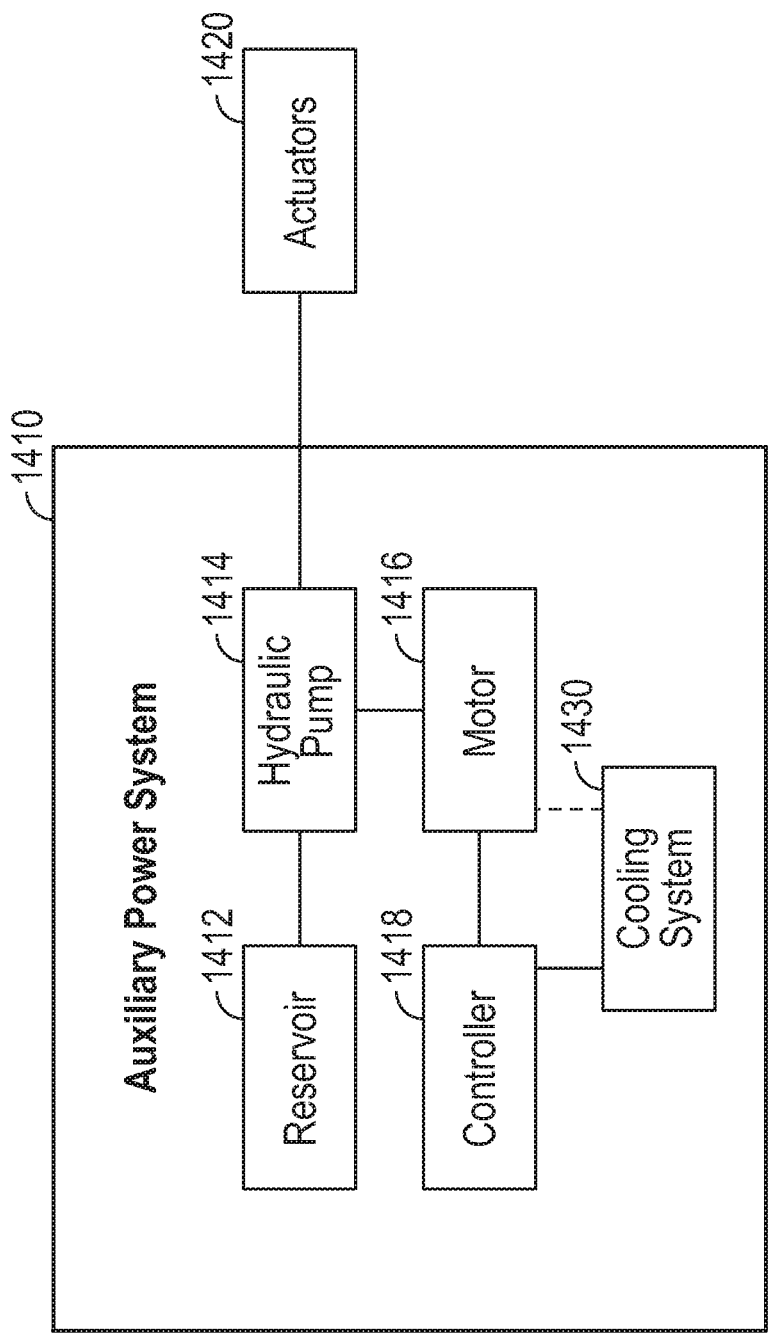
FIG. 3 is a block diagram of the auxiliary power system of FIG. 2, according to an exemplary embodiment.

As shown in FIG. 3, the auxiliary power system 1410 may provide pressurized hydraulic fluid to actuators 1420. The auxiliary power system 1410 includes a reservoir 1412 filled with a hydraulic fluid, such as oil. In some embodiments, the reservoir is filled with a different type and/or mixture of hydraulic fluid. For example, reservoir 1412 may be filled with water. The hydraulic fluid may be pressurized and/or pumped by a hydraulic pump 1414 powered by motor 1416 to supply the actuators 1420. The hydraulic pump 1414 may be hydrostatic or hydrodynamic. The hydraulic pump 1414 may be a gear pump, a rotary vane pump, a screw pump, a bent axis pump, an inline axial piston pump, a radial piston pump, a peristaltic pump, or any other pump or combination thereof known in the art. The motor 1416 is an electric motor powered by the energy storage and/or generation system 20. In some embodiments, the auxiliary power system 1410 includes one or more batteries or battery cells itself (e.g., to power the motor 1416, etc.). The motor 1416 may be a mechanical commutator motor, an electronic commutator motor, an asynchronous machine type, a synchronous machine type, or any other type and/or combination thereof known in the art. In the case of a fully electric refuse vehicle, the auxiliary power system 1410 can provide hydraulic power to the fully electric refuse vehicle via the motor 1416, the hydraulic pump 1414, and the reservoir 1412.

In some embodiments, the auxiliary power system 1410 includes an electrically controlled hydraulic swash plate coupled to one or more electronic sensors to throttle a flow of the hydraulic fluid to the actuators 1420. In some embodiments, the auxiliary power system 1410 includes a different type, number, or combination of elements. For example, the auxiliary power system 1410 may include a first motor to provide power to the hydraulic pump 1414 and a second motor to provide a power take-off for powering an external device. Additionally or alternatively, the auxiliary power system 1410 may include one or more power lines (e.g., a hydraulic line, an electrical cable, a compressed-air line, etc.) to provide external power. For example, the auxiliary power system 1410 may include a standard power cable as defined by the International Electrotechnical Commission (IEC) 60320 standard.

In various embodiments, the auxiliary power system 1410 includes a controller 1418 to control the auxiliary power system 1410. The controller may receive control signals from the refuse vehicle 10 and/or external systems and provide control signals to components of the auxiliary power system 1410. For example, the controller 1418 may monitor a level of hydraulic fluid in the reservoir 1412 and may operate one or more valves to control the flow of hydraulic fluid between the reservoir 1412 and the hydraulic pump 1414. As a further example, the controller 1418 may monitor a pressure level of hydraulic fluid being supplied to the actuators 1420 and may adjust an operation of the motor 1416 and/or the hydraulic pump 1414 to control the pressure level of the hydraulic fluid. In various embodiments, the controller 1418 includes a processing circuit. For example, the controller 1418 may include a processing circuit having a processor and memory, the memory storing instructions thereon that, when executed by the processor, cause the processor to perform the various operations described herein. In some embodiments, the controller 1418 is configured to determine whether the auxiliary power system 1410 is connected to the refuse vehicle 10. For example, the auxiliary power system 1410 may be integrated with a carry-can coupled to the refuse vehicle 10 and the controller 1418 may determine that the auxiliary power system 1410 is currently coupled to the refuse vehicle 10 and may operate the auxiliary power system 1410 in a first mode. To continue the previous example, the auxiliary power system 1410 may be decoupled from the refuse vehicle 10 and the controller 1418 may detect that the auxiliary power system 1410 is decoupled from the refuse vehicle 10 and may operate the auxiliary power system 1410 in a second mode.

In some embodiments, the auxiliary power system 1410 includes a cooling system 1430. The cooling system 1430 may be configured to regulate a temperature of the auxiliary power system 1410. For example, the cooling system 1430 may include water-cooling elements configured to capture thermal energy associated with the auxiliary power system 1410 and transport the thermal energy away from the auxiliary power system 1410 for dissipation. In some embodiments, the cooling system 1430 is an air cooling system. For example, the cooling system 1430 may use ambient air to cool the motor 1416. Additionally or alternatively, the cooling system 1430 may be a liquid cooling system. For example, the cooling system 1430 may use engine coolant to cool the motor 1416. In some embodiments, the cooling system 1430 includes a heat exchanger such as a radiator.

Figure 4A:
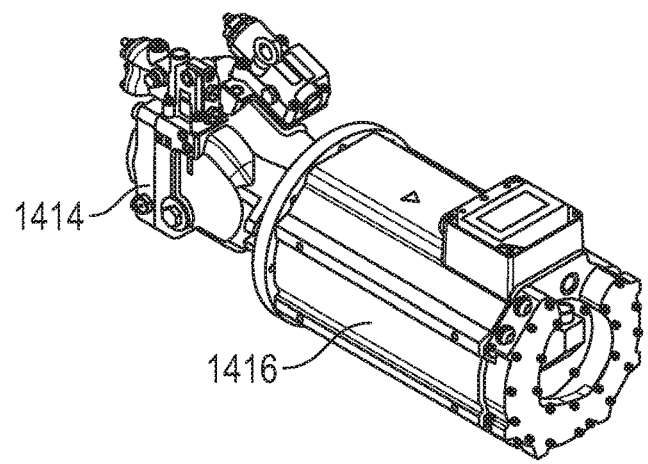
FIG. 4A illustrates a power take-off that may be part of the auxiliary power system of FIG. 3, according to an exemplary embodiment.
Figure 4B:
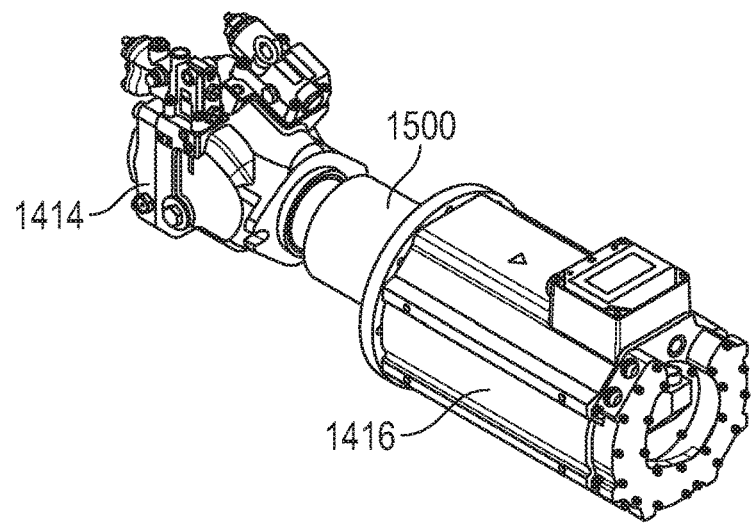
FIG. 4B illustrates the power take-off of FIG. 4A having a first coaxial ratio, according to an exemplary embodiment.
Figure 4C:
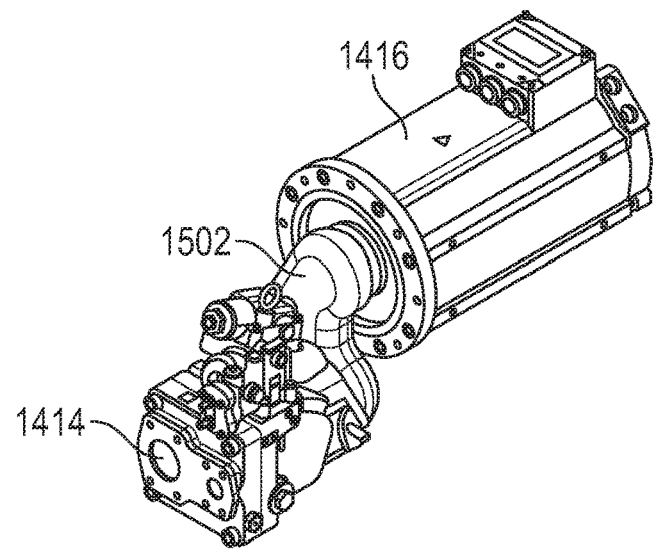
FIG. 4C illustrates the power take-off of FIG. 4A having a second coaxial ratio, according to an exemplary embodiment.

Referring now to FIGS. 4A-4C, several embodiments of the auxiliary power system 1410 are shown, according to several exemplary embodiments. In some embodiments, the auxiliary power system 1410 includes a power take-off. In various embodiments, the hydraulic pump 1414 couples to the motor 1416. In some embodiments, a first exchange 1500 integrates the hydraulic pump 1414 with the motor 1416. In various embodiments, the exchange is a coaxial ratio. For example, the first exchange 1500 may convert a first gearing associated with the hydraulic pump 1414 to a second gearing associated with the motor 1416. In some embodiments, the first exchange 1500 is a gear train. Additionally or alternatively, the first exchange 1500 may be or include a transmission. In various embodiments, the first exchange 1500 includes one or more interlocking gears. In some embodiments, the first exchange 1500 is configured to couple a component (e.g., a shaft, an axle, etc.) of the hydraulic pump 1414 to a component of the motor 1416. In various embodiments, a component of the hydraulic pump 1414, the motor 1416, and the first exchange 1500 are aligned (e.g., as shown in FIG. 4B). In some embodiments, a second exchange 1502 integrates the hydraulic pump 1414 with the motor 1416. In various embodiments, the second exchange 1502 translates a force associated with a component in a first position (e.g., on a first plane, etc.) to a component in a second position (e.g., on a second plane, etc.). In various embodiments, the second exchange 1502 translates mechanical energy from a component of the hydraulic pump 1414 having a first alignment to a component of the motor 1416 having a second alignment (e.g., as shown in FIG. 4C).

Figure 5A:
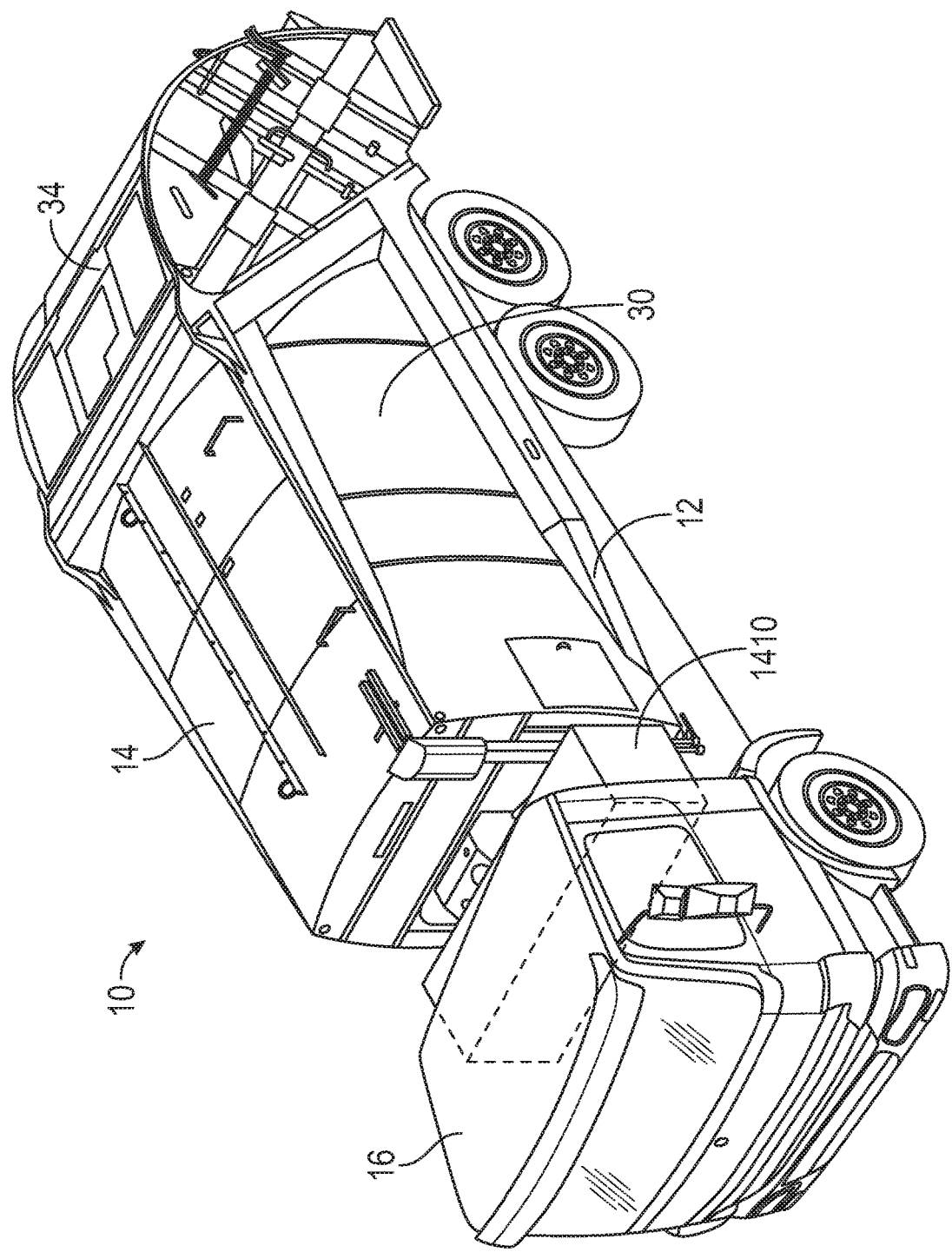
FIG. 5A illustrates a placement of the auxiliary power system of FIG. 3 for a rear-loading refuse truck, according to an exemplary embodiment.
Figure 5B:
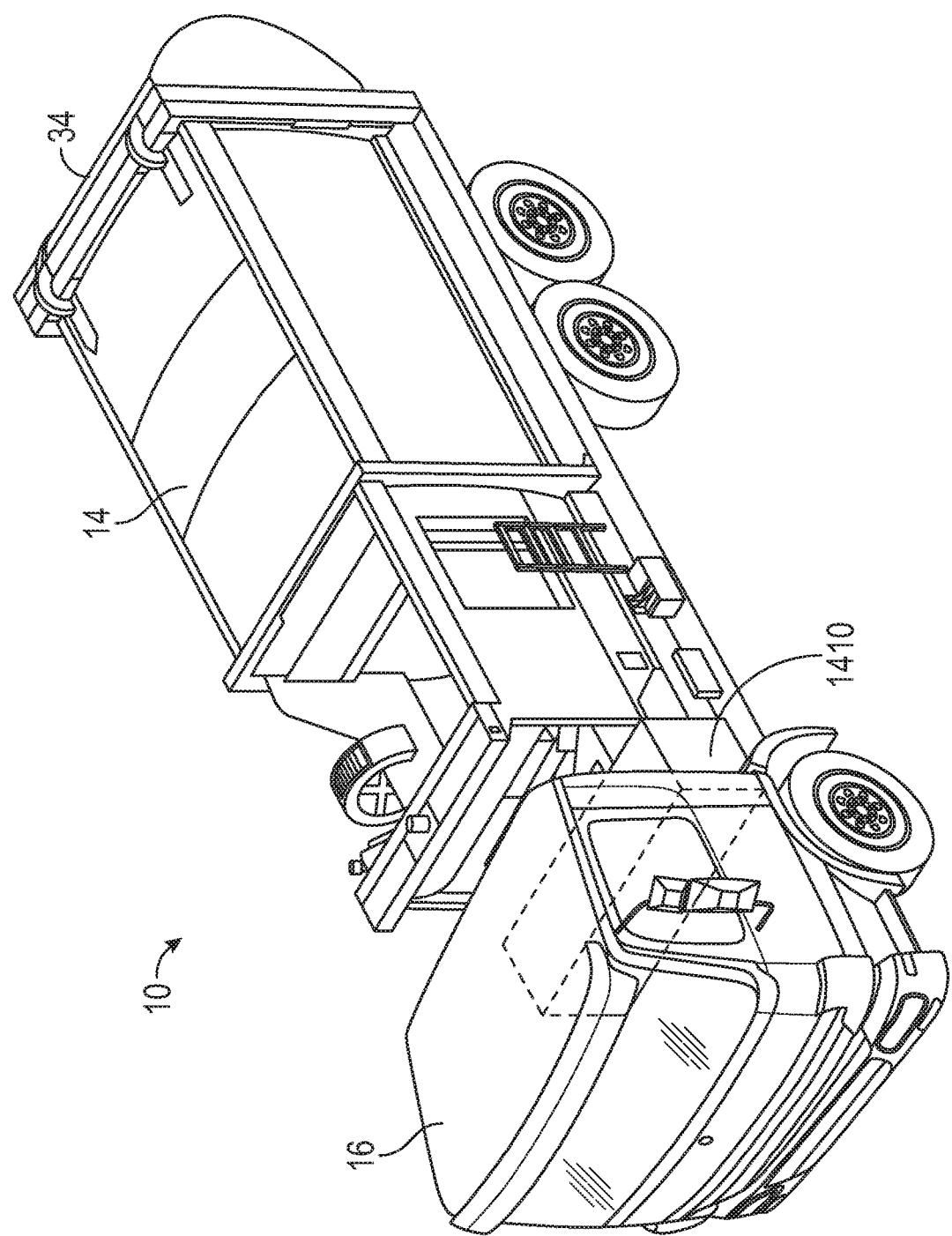
FIG. 5B illustrates a placement of the auxiliary power system of FIG. 3 for a side-loading refuse truck, according to an exemplary embodiment.
Figure 5C:
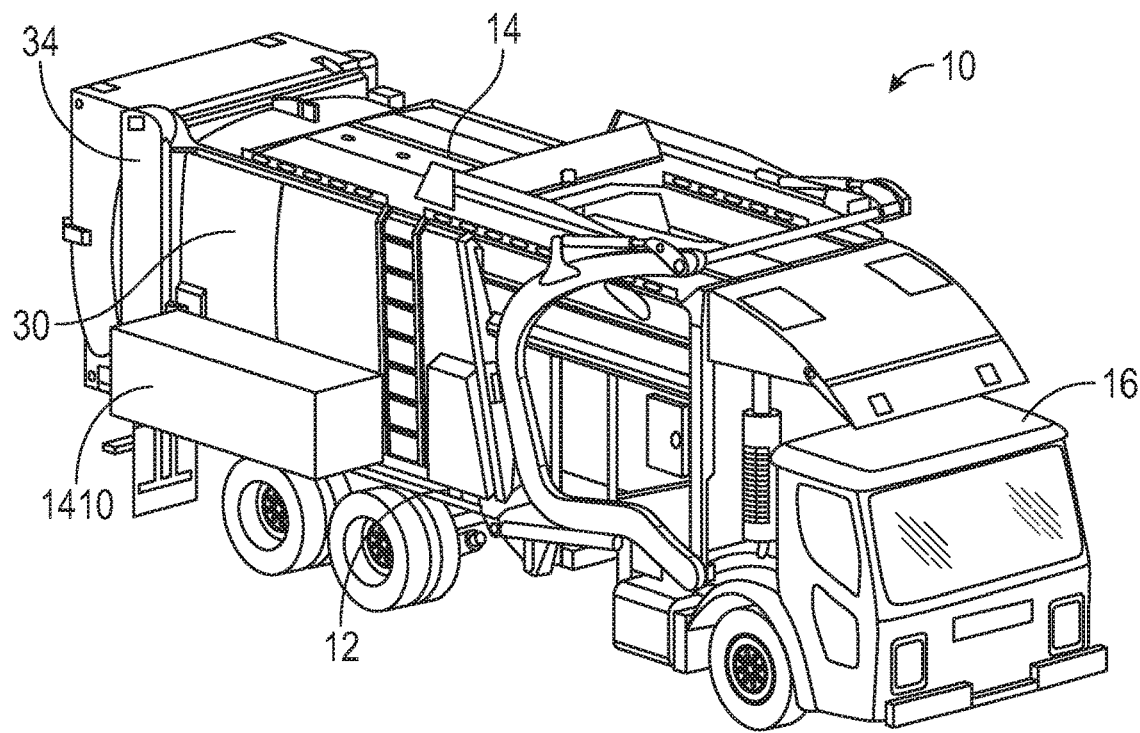
FIG. 5C illustrates a placement of the auxiliary power system of FIG. 3 for a front-loading refuse truck, according to an exemplary embodiment.
Figure 5D:
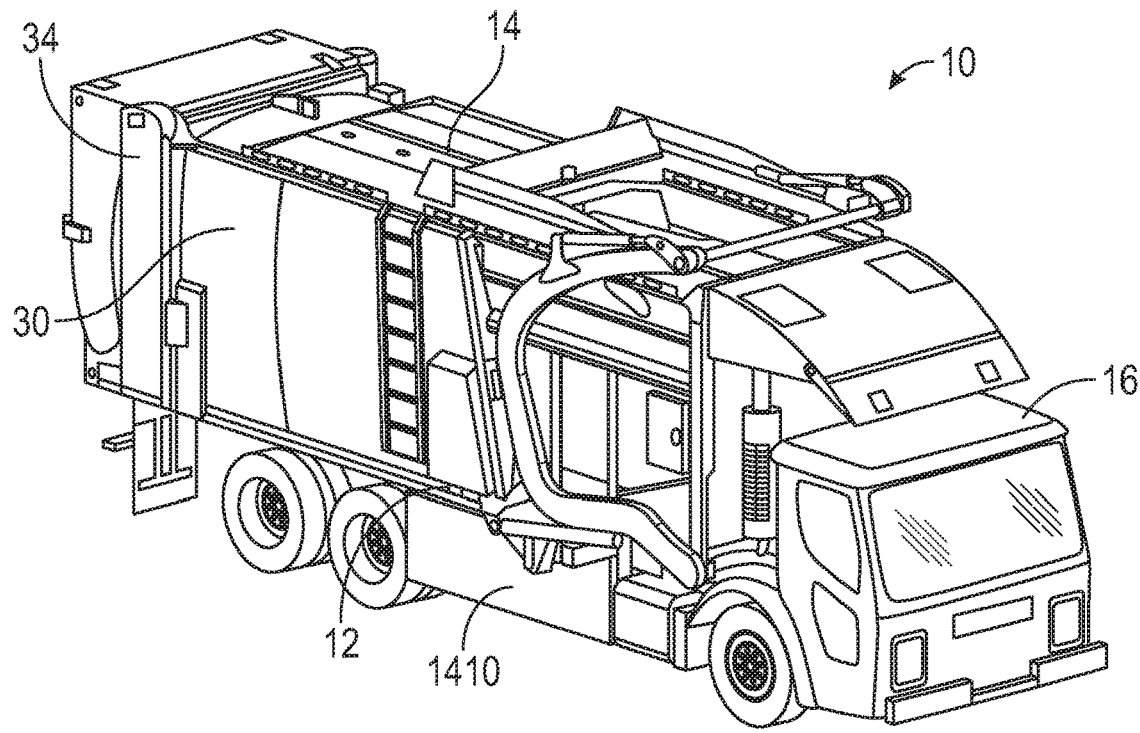
FIG. 5D illustrates another placement of the auxiliary power system of FIG. 3 for a front-loading refuse truck, according to an exemplary embodiment.

Referring now to FIGS. 5A-5D, several placements of the auxiliary power system 1410 are shown, according to several exemplary embodiments. In various embodiments, the auxiliary power system 1410 includes a power take-off configured to supply power (e.g., electrical, mechanical, hydraulic, etc.) to refuse vehicle 10. For example, the auxiliary power system 1410 may include a power take-off configured to provide hydraulic power to operate actuators of the tailgate 34. In some embodiments, the auxiliary power system 1410 is positioned between the cab 16 and the body 14 of refuse vehicle 10 (e.g., as shown in FIGS. 5A-5B). In some embodiments, positioning the auxiliary power system 1410 between the cab 16 and the body 14 is preferred for rear-loading and side-loading refuse trucks 10. In some embodiments, the auxiliary power system 1410 is positioned on a side of the body 14. For example, the auxiliary power system 1410 may be positioned on a rear quarter panel of panels 32 (e.g., as shown in FIG. 5C). In various embodiments, positioning the auxiliary power system 1410 on a side of the refuse truck 10 facilitates easy access to the auxiliary power system 1410. In some embodiments, the auxiliary power system 1410 is positioned on an underside of the body 14 (e.g., as shown in FIG. 5D). In various embodiments, the auxiliary power system 1410 may be mounted to the frame 12. It should be understood that auxiliary power system 1410 may be positioned anywhere on refuse vehicle 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle, comprising:
   a chassis;
   a body assembly coupled to the chassis, the body assembly defining a refuse compartment;
   an electric energy system; and
   an auxiliary power system comprising a reservoir to hold a hydraulic fluid, and a hydraulic pump powered by an electric motor, wherein the electric motor is powered by the electric energy system and the hydraulic pump pressurizes the hydraulic fluid to power one or more actuators; and
   wherein a prime mover of the refuse vehicle charges the electric energy system, and wherein at least one of the electric energy system or the auxiliary power system is configured to provide power to a carry can.

2. The refuse vehicle of claim 1, wherein the auxiliary power system includes a power take-off.

3. The refuse vehicle of claim 1, wherein the auxiliary power system is positioned between a cab of the refuse vehicle and the body of the refuse vehicle.

4. The refuse vehicle of claim 1, wherein the auxiliary power system is positioned below the body of the refuse vehicle.

5. The refuse vehicle of claim 1, wherein the auxiliary power system is mounted on a surface of the body of the refuse vehicle.

6. The refuse vehicle of claim 1, wherein the auxiliary power system includes a cooling system configured to thermally regulate the electric motor.

7. The refuse vehicle of claim 1, wherein the auxiliary power system includes one or more electrical energy storage devices configured to power the electric motor.

8. An auxiliary power system for a refuse vehicle, comprising:
   a reservoir to hold a hydraulic fluid;
   a hydraulic pump configured to pressurize the hydraulic fluid and provide the hydraulic fluid to one or more actuators;

an electric motor configured to power the hydraulic pump; and a mounting assembly configured to couple the auxiliary power system to the refuse vehicle; and wherein the auxiliary power system is configured to provide power to a carry can.

9. The auxiliary power system of claim 8, wherein the mounting assembly is configured to couple the auxiliary power system between a cab of the refuse vehicle and a body of the refuse vehicle.

10. The auxiliary power system of claim 8, wherein the mounting assembly is configured to couple the auxiliary power system below a body of the refuse vehicle.

11. The auxiliary power system of claim 8, wherein the mounting assembly is configured to couple the auxiliary power system to a surface of the body of the refuse vehicle.

12. The auxiliary power system of claim 8, further including a power take-off.

13. The auxiliary power system of claim 8, further including a cooling system configured to thermally regulate the electric motor.

14. The auxiliary power system of claim 8, further including one or more electrical energy storage devices configured to power the electric motor.

15. An electric refuse vehicle, comprising:
a chassis;
a body assembly coupled to the chassis, the body assembly defining a refuse compartment;
a prime mover, wherein the prime mover is a first electric motor; and
an auxiliary power system comprising a reservoir to hold a hydraulic fluid, and a hydraulic pump powered by a second electric motor, wherein the hydraulic pump pressurizes the hydraulic fluid to power one or more actuators, and wherein the auxiliary power system is configured to provide power to a carry can.

16. The electric refuse vehicle of claim 15, wherein the electric refuse vehicle includes one or more electrical energy storage devices configured to provide power to at least one of the first electric motor or the second electric motor, and wherein at least one of the one or more electrical energy storage devices are detachably coupled to the electric refuse vehicle.

17. The electric refuse vehicle of claim 15, wherein the auxiliary power system is positioned between a cab of the electric refuse vehicle and the body of the electric refuse vehicle.

18. The electric refuse vehicle of claim 15, wherein the auxiliary power system includes a power take-off.

19. The electric refuse vehicle of claim 15, wherein the auxiliary power system is positioned on a surface of the body of the electric refuse vehicle.

20. The electric refuse vehicle of claim 15, wherein the auxiliary power system is positioned below the body of the electric refuse vehicle.

\* \* \* \* \*